United States Patent [19]
Ejiri et al.

[11] Patent Number: 4,947,824
[45] Date of Patent: Aug. 14, 1990

[54] PULSE COMBUSTION FAT FRYER OF THE TABLE TYPE

[75] Inventors: Susumu Ejiri, Toyoake; Makoto Kimura, Inazawa; Yasuhiko Tabuchi, Sapporo; Nobuyoshi Yokoyama, Toyoake, all of Japan

[73] Assignee: Paloma Kogyo Kabushiki Kaisha, Nagoya, Japan

[21] Appl. No.: 404,509

[22] Filed: Sep. 8, 1989

[30] Foreign Application Priority Data

Sep. 12, 1988 [JP] Japan .................. 63-119573

[51] Int. Cl.⁵ ............................................ A47J 27/00
[52] U.S. Cl. .................................... 126/391; 99/403; 126/360 R; 126/343.5 A; 431/1
[58] Field of Search ................. 99/359, 330, 403, 337, 99/407, 409, 410, 467; 126/390, 391, 357, 350 R, 343.5 R, 360 R, 343.5 A; 431/1

[56] References Cited

U.S. PATENT DOCUMENTS

| | | | |
|---|---|---|---|
| 2,617,407 | 11/1952 | Johnson | 126/391 |
| 2,655,144 | 10/1953 | Keating | 126/391 |
| 3,217,704 | 11/1965 | Anetsberger | 126/391 |
| 3,282,198 | 11/1966 | Aho | 99/403 |
| 3,990,433 | 11/1976 | Keating | 99/403 |
| 4,397,299 | 8/1983 | Taylor et al. | 99/403 |
| 4,550,711 | 11/1985 | Griffiths | 431/1 |
| 4,552,123 | 11/1985 | Birkner et al. | 99/467 |
| 4,580,549 | 4/1986 | Sato | 126/391 |
| 4,628,903 | 12/1986 | Farnsworth et al. | 431/1 |
| 4,690,127 | 9/1987 | Sank | 99/403 |

Primary Examiner—Timothy F. Simone
Attorney, Agent, or Firm—Berman, Aisenberg & Platt

[57] ABSTRACT

A pulse combustion fat fryer of the table type includes a box-type cabinet having a front compartment and an upright rear compartment, an open-top vessel assembled within the front compartment to store an amount of cooking oil, the vessel having a front wall and a bottom wall the front part of which is located adjacent a bottom plate of the cabinet and the rear part of which is spaced upward from the bottom plate, a pulse combustion burner having a combustion chamber secured at its inlet end to the front wall of the vessel and immersed in the liquid in the vessel, a tailpipe connected at one end thereof to an exhaust port of the combustion chamber and being extended outwardly from the vessel, an air intake muffler and an exhaust muffler vertically disposed in parallel within the upright rear compartment of the cabinet, an air chamber casing secured to the front wall of the vessel and being connected to the air intake muffler to be supplied with fresh air, an exhaust decoupler located just below the rear part of the bottom wall of the vessel and having an inlet connected to an exhaust end of the tailpipe and an outlet in communication with the exhaust muffler, and an electric equipment box housed in a space between a side wall of the vessel and a side plate of the cabinet.

4 Claims, 2 Drawing Sheets

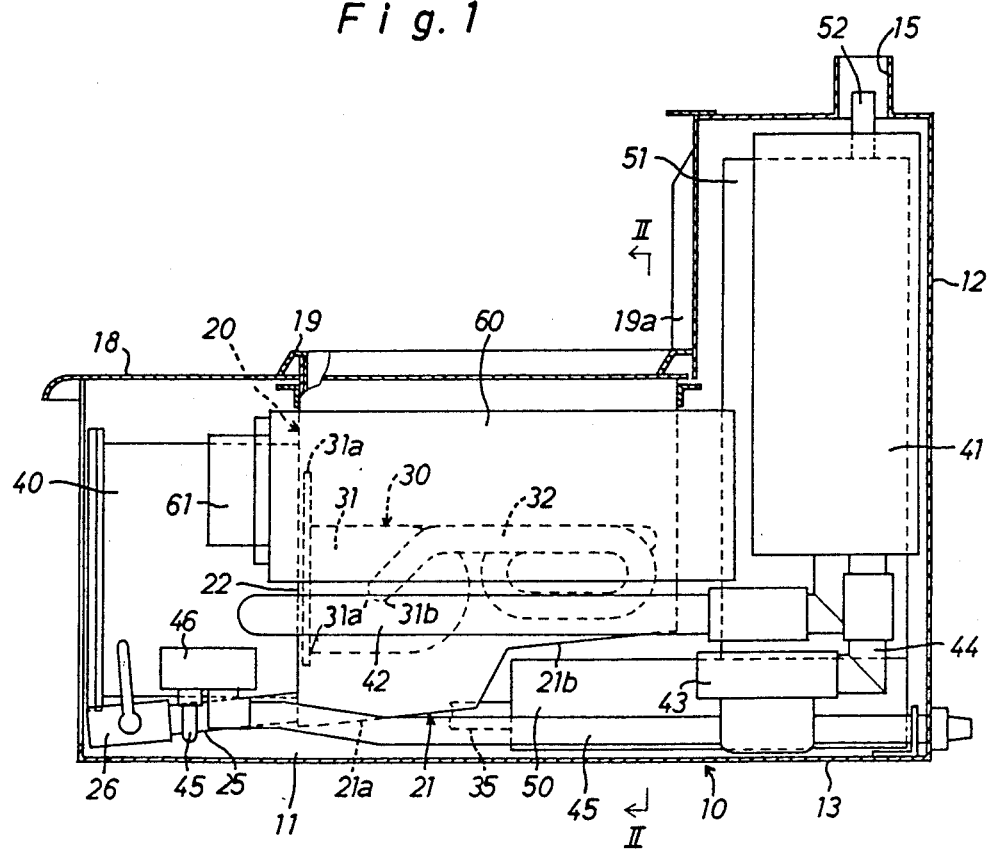

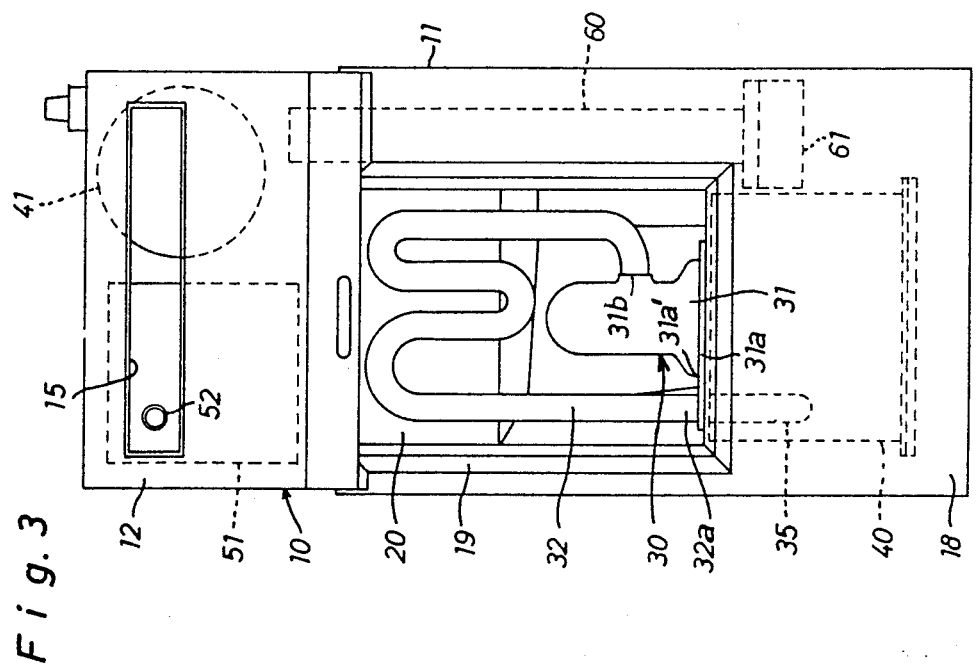
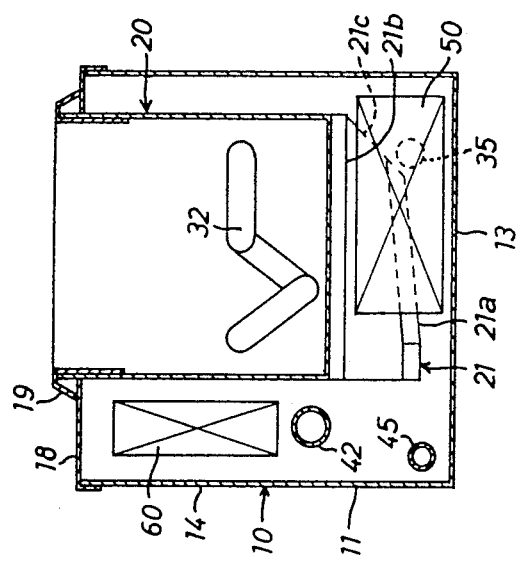

PULSE COMBUSTION FAT FRYER OF THE TABLE TYPE

BACKGROUND OF THE INVENTION

1. Field of the Invention

The present invention relates to a fat fryer for cooking food by temporarily dipping it into a liquid at high temperature. More particularly, the invention relates to a pulse combustion fat fryer of the table type.

2. Description of the Prior Art

In conventional fat fryers of the table type, an electric heater or a gas burner has been utilized heretofore. The electric heater, however, consumes a large amount of electric power in operation and causes frequent replacement of sealed heating wires associated thereto, resulting in an increase of maintenance cost of the fryer. In application of the gas burner, a fire tube of large capacity associated thereto for heat exchange is immersed in liquid in a vessel of the fat fryer. Since the interior of the vessel is occupied by the fire tube, it is very difficult to provide the fat fryer in a compact arrangement.

In recent years, pulse combustion technology has been utilized in heating units such as deep fat fryers using gaseous fuel. However, almost all the pulse combustion fat fryers are designed large in size to be installed on a floor. In the conventional pulse combustion fat fryers, the associated air intake muffler, exhaust decoupler and muffler are located just below a liquid vessel of the fryer. It is, therefore, difficult to lower the position of the liquid vessel for providing the fat fry in a compact arrangement.

SUMMARY OF THE INVENTION

Under such prior art as described above, the present invention is directed to provide a pulse combustion fat fryer of the table type which can be installed on a table, a cooking appliance cabinet or the like.

According to the present invention, there is provided a pulse combustion fat fryer of the table type which includes a box-type cabinet having a front compartment and an upright rear compartment located at the rear end of the front compartment, an open-top vessel assembled within the front compartment of the cabinet to store an amount of liquid such as cooking oil or other fluid medium to be heated, the vessel having a front wall and a bottom wall the front part of which is located adjacent a bottom plate of the cabinet and the rear part of which is spaced upward from the bottom plate of the cabinet, a pulse combustion burner mounted to the vessel and having a combustion chamber secured at its inlet end to the front wall of the vessel and immersed in the liquid in the vessel, and a tailpipe connected at one end thereof to an exhaust port of the combustion chamber in such a manner that the great part of the tailpipe is immersed in the liquid and being extended outwardly through the front wall of the vessel.

In the fat fryer described above, an air intake muffler and an exhaust muffler are vertically disposed in parallel within the upright rear compartment of the cabinet, an air chamber casing is secured to the front wall of the vessel to supply fresh air into the combustion chamber therethrough, the air chamber casing being connected to the air intake muffler to be supplied with the fresh air, an exhaust decoupler of large capacity is located in a space between the rear part of the bottom wall of the vessel and the bottom plate of the cabinet, the exhaust decoupler having an inlet connected to an exhaust end of the tailpipe and an outlet in communication with the exhaust muffler, and an electric equipment box is housed in a space between a side wall of the vessel and a side plate of the cabinet to contain therein electric equipments necessary for control of operation of the burner.

With such arrangement of the above component parts, the bottom wall 21 of the vessel can be located adjacent the bottom plate of the cabinet to lower the height of the cabinet suitable for installation of the fat fryer on a table, a cooking appliance cabinet or the like.

BRIEF DESCRIPTION OF THE DRAWINGS

Other objects, features and advantages of the present invention will be more readily appreciated from the following detailed description of a preferred embodiment thereof when considered with reference to the accompanying drawings, in which:

FIG. 1 is a schematic side elevation view of a pulse combustion fat fry of the table type in accordance with the present invention, partially shown in section to illustrate certain features of the fat fryer;

FIG. 2 is a cross-sectional view taken along line II—II in FIG. 1, illustrating an exhaust decoupler and an electric equipment box in relation to a liquid vessel of the fat fryer; and FIG. 3 is a plan view of the fat fryer shown in FIG. 1.

DESCRIPTION OF THE PREFERRED EMBODIMENT

In FIGS. 1–3 of the drawings, there is illustrated a pulse combustion fat fryer of the table type which includes an open-top liquid vessel 20 of generally rectangular in shape assembled within a box-type cabinet 10 to store therein an amount of cooking oil or other fluid medium to be heated. The cabinet 10 has a front compartment 11 and an upright rear compartment 12 located at the rear end of front compartment 11. As shown in FIGS. 1 and 3, a horizontal cover plate 18 is detachably mounted on the upper end of front compartment 11 to define a rectangular opening for liquid vessel 20, and a rectangular shaped stack 15 is integrally formed on an upper plate of upright rear compartment 12.

As shown in FIGS. 1 and 3, the vessel 20 has a bottom wall 21 the front part 21a of which is located in a lower position and the rear part 21b of which is located in an upper position. As shown in FIG. 2, the front part 21a of bottom wall 21 is inclined at its leftside 21c at an angle of approximately 45 centigrade. As shown in FIG. 3, the vessel 20 is housed in the front compartment 11 of cabinet 10 at a position displaced leftward and rearward and is secured in place in such a manner that the upper rim portion of vessel 20 projects slightly upward from the upper end of front compartment 11. The front part 21a of bottom wall 21 is located adjacent a bottom plate 13 of cabinet 10, while the rear part 21b of bottom wall 21 is spaced upward from the bottom plate 13 of cabinet 10. The vessel 20 has a front wall 22 the lowermost portion of which is connected to a forwardly inclined drain pipe 25. The drain pipe 25 is provided thereon with a drain cock 26, and the respective portions of bottom wall 21 are inclined forwardly toward the drain pipe 25 to fully discharge the wasted liquid from vessel 20. The horizontal cover plate 18 is arranged to cover the upper periphery of front compartment 11 surrounding the upper portion of vessel 20. A rectangular frame 19 is coupled at its inner periphery with the upper end of vessel 20 and engaged at its outer periphery with the upper surface of cover plate 18. The rectangular frame 19 is integrally formed at its rear end with an upright portion 19a attached to a front surface of upright rear compartment 12.

As shown in FIGS. 1 and 3, a pulse combustion burner 30 is mounted to the front wall 22 of vessel 20 and immersed in liquid in the vessel 20. The pulse combustion burner 30 includes, as main components, an air-fuel mixer head (not shown), a combustion chamber 31, and a tailpipe 32. The combustion chamber 31 is integrally formed at its inlet end 31a with an attachment flange 31a a which is secured to the inner surface of front wall 22 through a gasket in a liquid-tight manner by means of screws. The combustion chamber 31 is located above the front part 21a of bottom wall 21. The tailpipe 32 has an inner end welded to an exhaust port 31b of the combustion chamber 31 in a liquid-tight manner and is housed in a loop shape in the vessel 20 above the rear part 21b of bottom wall 21. The tailpipe 32 extends outwardly through the attachment flange 31a of combustion chamber 31 and front wall 22 of vessel 20 and has an exhaust end portion 32a welded to the attachment flange 31a in a liquid-tight manner and connected to an extension pipe 35 having one end secured to the outer surface of front wall 22. The air-fuel mixer head is fixedly mounted to the outer surface of front wall 22 in an air-tight manner and is in open communication with the interior of combustion chamber 31 to supply a mixture of gaseous fuel and air thereinto. As shown in FIGS. 1 and 3, an air chamber casing 40 is secured to the outer surface of front wall 22 in an airtight manner to contain therein the mixer head and a gas container (not shown).

As shown in FIGS. 1 and 3, a cylindrical air intake muffler 41 is vertically disposed within the upright rear compartment 12 and is connected at its outlet to the air chamber casing 40 by means of an air supply pipe 42. Arranged below the air intake muffler 41 is an electrically operated air blower 43 which is connected to an inlet of muffler 41 by means of a communication pipe 44. Thus, the air chamber casing 40 is supplied with fresh air from the blower 43 through the pipe 44, intake muffler 41 and pipe 42, and the mixer head is supplied with the fresh air from casing 40 through a non-return air intake flapper valve (not shown) provided thereon in a conventional manner. The gas container in casing 40 is connected at its inlet to a source of gaseous fuel (not shown) by means of a gas supply conduit 45 and at its outlet to the mixer head through a non-return gas intake flapper valve (not shown). The gas supply conduit 45 is provided thereon with an electromagnetic valve 46 for control of the flow quantity of gaseous fuel supplied therethrough into the gas container.

As shown in FIG. 1, an exhaust decoupler 50 of large capacity is connected at its inlet to the extension pipe 35 and at its outlet to an exhaust muffler 51 which is vertically disposed in parallel with the intake muffler 41 within the upright rear compartment 12. The extension exhaust pipe 35 extends rearwardly through a space just below the inclined leftside 21c of bottom wall 21. As shown in FIG. 2, the exhaust decoupler 50 is in the form of a rectangular box the capacity of which is more than 10 times the capacity of combustion chamber 31. The front half of decoupler 50 is located in a space between the rear part 21b of bottom wall 21 of vessel 20 and the bottom plate 13 of cabinet 10. The exhaust muffler 51 is in the form of a rectangular box which is mounted on the rear portion of decoupler 50 and communicated with the interior of decoupler 50 through an appropriate throttle (not shown). The exhaust muffler 51 is provided at its upper end with an exhaust pipe 52 which is located within the rectangular shaped stack 15.

As shown in FIGS. 2 and 3, an electric equipment box 60 is disposed within a space between a right-hand side plate 14 of cabinet 10 and a side wall of vessel 20. A cooling fan 61 is mounted to the front end of electric equipment box 60 to cause the flow of cooling air into the interior of box 60. The electric equipment box 60 is provided therein with electric equipments for control of the electromagnetic valve 46 and blower 43 and for control of an ignition device (not shown) of the burner 30, various indication devices (not shown) and the like. The electric equipments in box 60 are arranged to be protected from radiant heat of the vessel 20 and cooled by the air applied thereto from fan 61. In addition, the air intake pipe 42 and gas supply conduit 45 are located below the electric equipment box 60.

In operation, the electromagnetic valve 46 is opened to effect the supply of gaseous fuel into the gas container, while the air blower 43 is operated for a predetermined short period of time to effect the supply of air into air intake muffler 41. Thus, the mixer head is supplied with the gaseous fuel and air from the gas container and casing 40 through the flapper valves to supply a mixture of the gaseous fuel and air into the combustion chamber 31 therefrom. The mixture is ignited by energization of a spark plug (not shown) in the combustion chamber 31. When explosive combustion of the mixture takes place at high temperature in the combustion chamber 31, the flapper valves are closed by a momentary positive pressure in the combustion chamber 31 to block the inward flow of gaseous fuel and air into the mixer head, and the combustion products are exhausted through the tailpipe 32, extension pipe 35, decoupler 50 and muffler 51. Ignition and combustion are followed by a contraction which produces a momentary negative pressure in the tailpipe 32 for drawing in a fresh supply of gaseous fuel and air through the flapper valves. During the momentary negative pressure, the flow of combustion products at the exhaust end of tailpipe 32 is reversed. The fresh charge which has been drawn in during the momentary negative pressure automatically ignites without the need for energization of the spark plug, and the explosive combustion repeats itself. A resonance is established in the tailpipe 32 at a frequency of approximately 100 hertz, and the pulse combustion burner 30 operates as a self-powered burner.

During the operation of the pulse combustion burner 30, the liquid in vessel 20 is efficiently heated by thermal exchange with the combustion products passing through tailpipe 32, and the combustion products are exhaust into the atmospheric air through the extension pipe 35, decoupler 50 and muffler 51. In this instance, the decoupler 50 coacts with the tailpipe and extension pipe 35 to stabilize the pulse combustion in the combustion chamber 31.

In the fat fryer described above, the air intake muffler 41 and exhaust muffler 51 of large capacity are housed in parallel within the upright rear compartment 12 of cabinet 10, the front half of decoupler 50 is located in the space between the rear part 21a of bottom wall 21 of vessel 20 and the bottom plate 13 of cabinet 10, the electric equipment box 60 is located in the space between the side plate 14 of cabinet 10 and the side wall of vessel 20, the extension pipe 35 is located just below the inclined side portion 21c of bottom wall 21 of vessel 20, and the air intake pipe 42 and gas supply conduit 45 are located below the electric equipment box 60. With such arrangement of the component parts described above, the bottom wall 21 of vessel 20 can be located adjacent the bottom plate 13 of cabinet 10 at its front part 21a to lower the height of cabinet 10 suitable for installation of the fat fryer on a table, a cooking appliance cabinet or the like.

Although the preferred embodiment of the present invention has been shown and described, it should be understood that various modifications and rearrangements of the component parts may be resorted to without departing from the scope of the invention as disclosed and claimed herein.

What is claimed is:

1. A pulse combustion fat fryer of the table type comprising a box-type cabinet having a front compartment and an upright rear compartment located at the rear end of said front compartment, an open-top vessel assembled within the front compartment of said cabinet to store an amount of liquid such as cooking oil or other fluid medium to be heated, said vessel having a front wall and a bottom wall the front part of which is located adjacent a bottom plate of said cabinet and the rear part of which is spaced upward from said bottom plate, a pulse combustion burner mounted to said vessel and having a combustion chamber secured at its inlet end to the front wall of said vessel and immersed in the liquid in said vessel, and a tailpipe connected at one end thereof to an exhaust port of said combustion chamber in such a manner the great part of said tailpipe is immersed in the liquid and being extended outwardly from said vessel, wherein an air intake muffler and an exhaust muffler are vertically disposed in parallel within the upright rear compartment of said cabinet, an air chamber casing is secured to the front wall of said vessel to supply fresh air into said combustion chamber therethrough, said air chamber casing being connected to said air intake muffler to be supplied with the fresh air, an exhaust decoupler is located in a space between the rear part of said bottom wall of said vessel and the bottom plate of said cabinet, said exhaust decoupler having an inlet, connected to an exhaust end of said tailpipe and an outlet in communication with said exhaust muffler, and an electric equipment box is housed in a space between a side wall of said vessel and a side plate of said cabinet to contain therein electric equipments necessary for control of operation of said burner.

2. A pulse combustion fat fryer as claimed in claim 1, wherein said tailpipe is extended outwardly through the front wall of said vessel, and wherein an extension pipe is located just below an inclined side portion of said bottom wall of said vessel at an opposite position with respect to said electric equipment box, said extension pipe being connected at one end thereof to the exhaust end of said tailpipe and at the other end thereof to the inlet of said exhaust decoupler.

3. A pulse combustion far fryer as claimed in claim 1, wherein said exhaust decoupler is in the form of a rectangular box, and said exhaust muffler is in the form of a rectangular box mounted on the rear portion of said exhaust decoupler and being communicated at its lower end with the interior of said decoupler.

4. A pulse combustion fat fryer as claimed in claim 1, wherein an air supply pipe is located below said electric equipment box and connected at one end thereof to said air chamber casing and at the other end thereof to a bottom portion of said air intake muffler.

* * * * *